US012572826B2

(12) United States Patent
Vaishnav et al.

(10) Patent No.: US 12,572,826 B2
(45) Date of Patent: Mar. 10, 2026

(54) ASYNCHRONOUS RULE COMPILATION IN A MULTI-TENANT ENVIRONMENT

(71) Applicant: Salesforce, Inc., San Francisco, CA (US)

(72) Inventors: Parth Vijay Vaishnav, San Francisco, CA (US); Mitchell Christensen, San Francisco, CA (US); Kevin Han, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 677 days.

(21) Appl. No.: 17/993,761

(22) Filed: Nov. 23, 2022

(65) Prior Publication Data

US 2024/0169219 A1 May 23, 2024

(51) Int. Cl.
*G06N 5/025* (2023.01)
*G06F 9/48* (2006.01)

(52) U.S. Cl.
CPC ........... *G06N 5/025* (2013.01); *G06F 9/4881* (2013.01)

(58) Field of Classification Search
CPC ...... G06N 5/025; G06N 5/046; G06F 9/4881; G06F 8/41
USPC .......................................................... 718/102
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,694,603 A | * 12/1997 | Reiffin | G06F 9/4825 |
| | | | 718/107 |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |
| 6,092,083 A | 7/2000 | Brodersen et al. | |
| 6,161,149 A | 12/2000 | Achacoso et al. | |

(Continued)

OTHER PUBLICATIONS

Red Hat, "Red Hat JBoss BRMS 6.4 Getting Started Guide", pp. 1-32; May 13, 2019.

(Continued)

*Primary Examiner* — Adam Lee
(74) *Attorney, Agent, or Firm* — Nicholson, De Vos, Webster & Elliott, LLP

(57) ABSTRACT

Implementation of a guided rules editor includes a rule compilation process comprising receiving, by an event handler, a compile rules event from a process external to the rule compiler. A set of rules is retrieved from a database and loading the set of rules into a memory by the event handler. Responsive to identifying any template rules, data is bound to the template rules. Both the template rules and any non-template rules are translated into a rules language specification. A rule compilation process is performed asynchronously from a rule execution process to translate the rule language specification into a knowledge base that is to be used as input by a rule execution process. A compile completion event is emitted at compile completion.

18 Claims, 10 Drawing Sheets

200

Display a view of the guided rules editor user interface (UI) on a client device
202

Fetch the metadata of the organization of the user, use the metadata to identify which data of the organization is eligible for rule creation, and use attributes of the metadata to determine a layout of the one or more UI selection elements
204

Render the UI selection elements in positions in the view according to the layout and automatically populate at least a portion of the UI selection elements with the data of the organization
206

Receive user input of the one or more UI selection elements and generate and save one or more organization-specific rules to be executed by a rules engine
208

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 6,925,431 B1 * | 8/2005 | Papaefstathiou ....... G06F 30/33 703/22 |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,316,309 B2 | 11/2012 | Bartek et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,563,422 B2 | 2/2017 | Cragun et al. |
| 9,740,743 B2 | 8/2017 | Jagota et al. |
| 9,817,677 B2 | 11/2017 | Pessoa et al. |
| 10,152,497 B2 | 12/2018 | Doan et al. |
| 10,235,476 B2 | 3/2019 | Vaishnav et al. |
| 10,387,388 B2 | 8/2019 | Doan et al. |
| 10,733,613 B2 | 8/2020 | Vaishnav et al. |
| 10,802,660 B1 | 10/2020 | Krivopaltsev et al. |
| 10,901,996 B2 | 1/2021 | Doan et al. |
| 10,949,395 B2 | 3/2021 | Doan et al. |
| 11,138,222 B2 | 10/2021 | Semlani et al. |
| 11,244,238 B2 | 2/2022 | Jagota et al. |
| 11,442,989 B2 | 9/2022 | Dvinov et al. |
| 11,544,124 B1 * | 1/2023 | Degioanni ............ G06F 9/5072 |
| 12,106,131 B2 | 10/2024 | Vaishnav et al. |
| 12,136,114 B2 | 11/2024 | Vaishnav et al. |
| 12,235,849 B2 | 2/2025 | Vaishnav et al. |
| 12,260,434 B2 | 3/2025 | Vaishnav et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0107754 A1 * | 8/2002 | Stone ................ H04M 15/7655 705/34 |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0184585 A1 | 10/2003 | Lin et al. |
| 2003/0187921 A1 | 10/2003 | Diec et al. |

(56) References Cited

U.S. PATENT DOCUMENTS

| | | | |
|---|---|---|---|
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2007/0150820 A1 | 6/2007 | Salvo | |
| 2008/0208785 A1 | 8/2008 | Trefler et al. | |
| 2008/0249972 A1 | 10/2008 | Dillon | |
| 2008/0313556 A1* | 12/2008 | Zhang | H04L 63/0281 |
| | | | 715/765 |
| 2009/0063382 A1* | 3/2009 | Proctor | G06N 5/025 |
| | | | 706/47 |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2009/0287617 A1* | 11/2009 | Schmidt | G06Q 10/06 |
| | | | 706/11 |
| 2011/0099494 A1 | 4/2011 | Yan et al. | |
| 2011/0185294 A1 | 7/2011 | Binder et al. | |
| 2011/0218958 A1 | 9/2011 | Warshavsky | |
| 2011/0247051 A1 | 10/2011 | Bulumulla | |
| 2012/0005592 A1 | 1/2012 | Shrinivas | |
| 2012/0042218 A1 | 2/2012 | Cinarkaya | |
| 2012/0143812 A1* | 6/2012 | Proctor | G06N 5/025 |
| | | | 706/47 |
| 2012/0191865 A1 | 7/2012 | Duff et al. | |
| 2012/0233137 A1 | 9/2012 | Jakobson et al. | |
| 2012/0290407 A1 | 11/2012 | Hubbard et al. | |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya | |
| 2014/0122406 A1* | 5/2014 | Xia | G06N 5/025 |
| | | | 706/47 |
| 2014/0359537 A1 | 12/2014 | Jackobson et al. | |
| 2017/0139903 A1* | 5/2017 | Small | G06F 40/30 |
| 2017/0293629 A1 | 10/2017 | Doan et al. | |
| 2018/0096003 A1 | 4/2018 | Vaishnav et al. | |
| 2018/0129686 A1 | 5/2018 | Vaishnav | |
| 2018/0183671 A1 | 6/2018 | Dvinov et al. | |
| 2019/0236184 A1 | 8/2019 | Dvinov et al. | |
| 2019/0370363 A1 | 12/2019 | Hersans et al. | |
| 2020/0311267 A1* | 10/2020 | Klonowski | G06F 9/45558 |
| 2021/0241300 A1 | 8/2021 | Vaishnav et al. | |
| 2021/0241301 A1 | 8/2021 | Christensen et al. | |
| 2021/0241328 A1 | 8/2021 | Christensen et al. | |
| 2021/0241329 A1 | 8/2021 | Christensen et al. | |
| 2021/0241330 A1 | 8/2021 | Vaishnav et al. | |
| 2021/0326311 A1 | 10/2021 | Ker et al. | |
| 2021/0406936 A1 | 12/2021 | Christensen et al. | |

OTHER PUBLICATIONS

Red Hat JBoss BRMS 6.4, The User Guide for Red Hat JBoss BRMS, 2019 Red Hat, Inc https://access.redhat.com/documentation/en-us/red_hat_jboss_brms/6.4/html/user_guide/index.

* cited by examiner

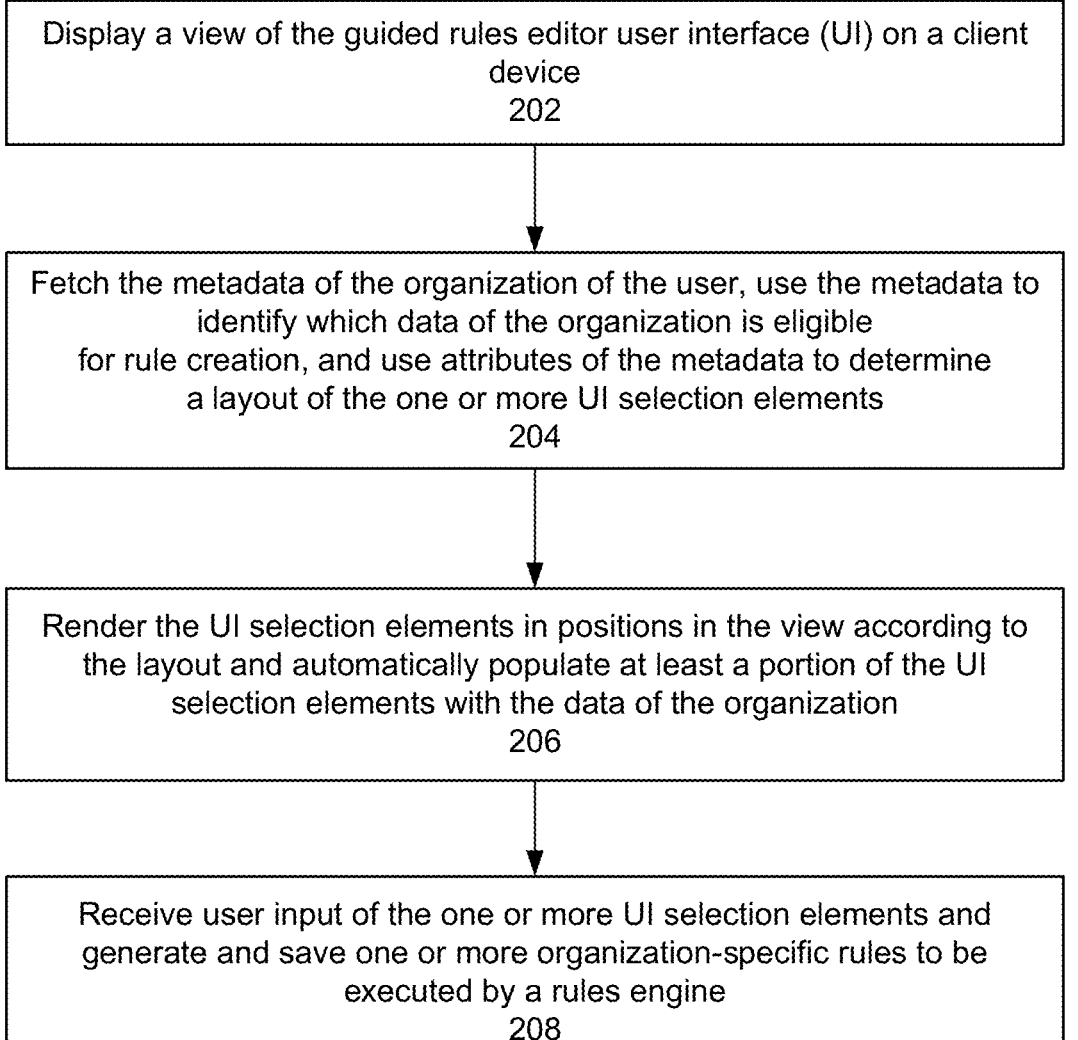

200

Display a view of the guided rules editor user interface (UI) on a client device
202

Fetch the metadata of the organization of the user, use the metadata to identify which data of the organization is eligible for rule creation, and use attributes of the metadata to determine a layout of the one or more UI selection elements
204

Render the UI selection elements in positions in the view according to the layout and automatically populate at least a portion of the UI selection elements with the data of the organization
206

Receive user input of the one or more UI selection elements and generate and save one or more organization-specific rules to be executed by a rules engine
208

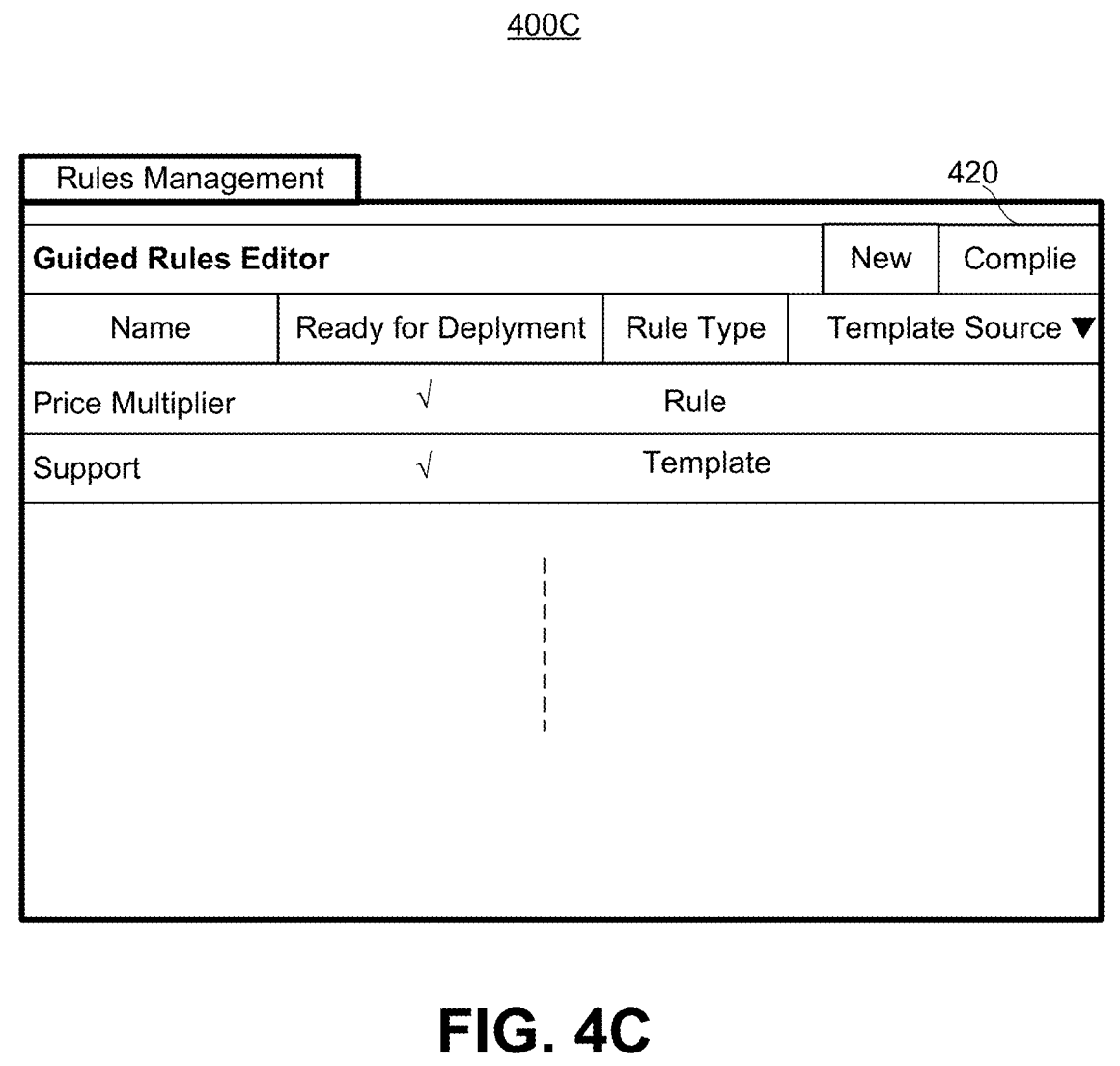

| Rules Management | | | | 420 |
|---|---|---|---|---|
| Guided Rules Editor | | | New | Complie |
| Name | Ready for Deplyment | Rule Type | Template Source ▼ | |
| Price Multiplier | √ | Rule | | |
| Support | √ | Template | | |

FIG. 4C

ASYNCHRONOUS RULE COMPILATION IN A MULTI-TENANT ENVIRONMENT

TECHNICAL FIELD

One or more implementations relate to the field of rules engines; and more specifically, to asynchronous rule compilation in a multi-tenant environment.

BACKGROUND ART

A business rules engine is a software system that executes one or more business rules in a runtime production environment. Each rule comprises a set of the conditions followed by the set of actions. Any "if-then" statement that appears in traditional business logic may qualify as a business rule. The rules represent logic of represented from, for example, company policies, legal regulation, or other sources. A business rule system enables these company policies and other operational decisions to be defined, tested, executed and maintained separately from application code. Rule engine software is commonly provided as a component of a business rule management system, which may provide the ability to register, define, classify, and manage all the rules, verify consistency of rules definitions, define the relationships between different rules.

After a user creates a set of rules, the user invokes the rules engine execute the rules. Traditionally, compiling is part of rule execution performed by the rules engine. In conventional rules engines, compilation and execution happens at the same time, where the rules engine synchronously performs compilation first followed by execution of the compiled rules, which introduces latency. For example, the compilation can take 1-2 seconds per rule, so with a large rule set, the compilation process is both memory intensive and time consuming, and adds to the overall time to execute the rules.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 2 is flow diagram illustrating the process performed by the metadata driven guided rules editor and a controller.

FIGS. 4A-4C are diagrams illustrating example rule pages displayed by the guided rules editor.

DETAILED DESCRIPTION

The following description describes implementations for an improved process and architecture for asynchronous rule compilation in a multi-tenant environment. The described subject matter can be implemented in the context of any cloud-based computing environment including, for example, a multi-tenant database system.

Figure 1:
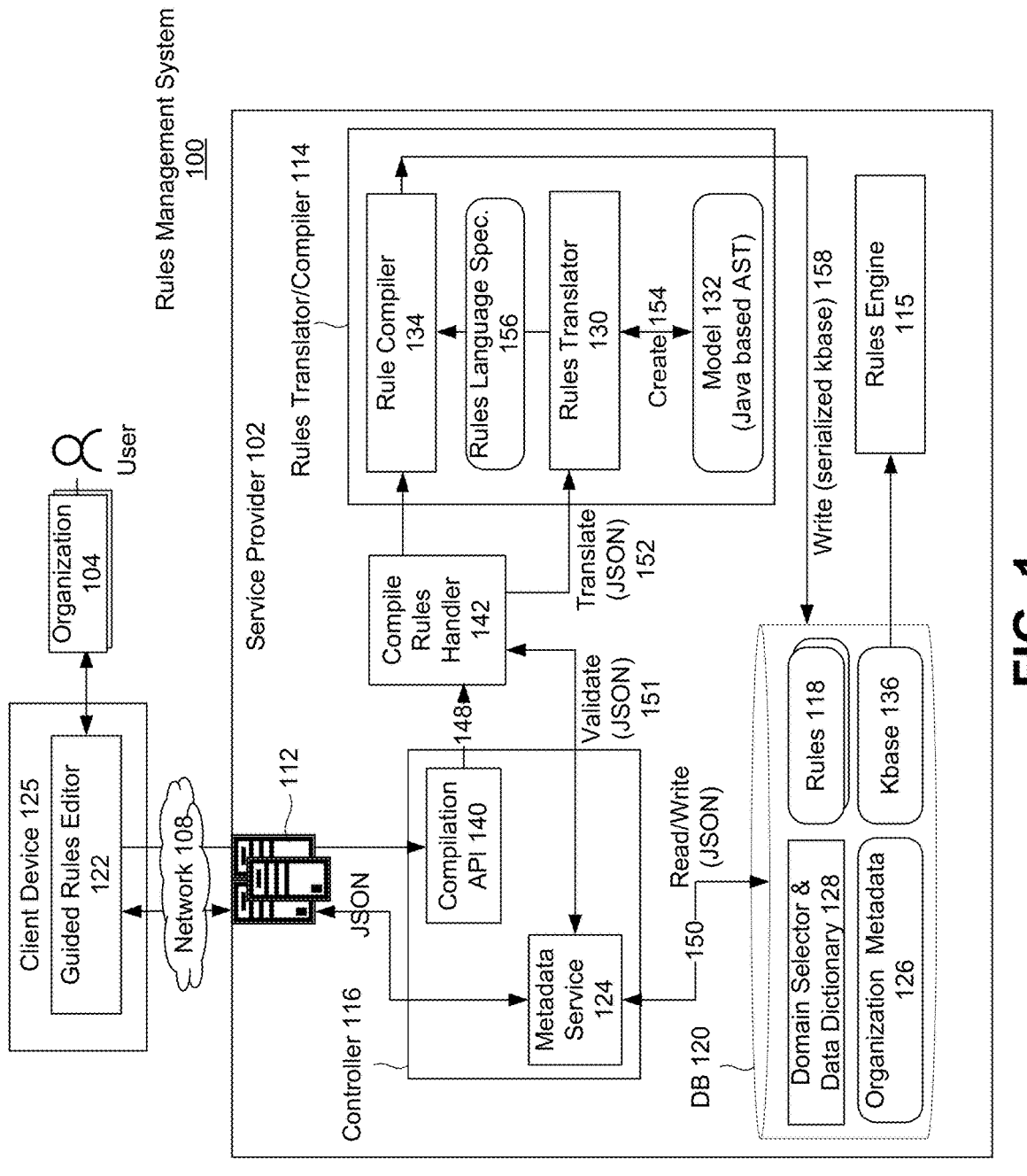
FIG. 1 illustrates a business rule system according to one example implementation.

For context, FIG. 1 illustrates a rules management system according to one example implementation. The rules management system 100 comprises a service provider 102 that provides software services to one or more organizations 104 over a network 108 through compute resources 112. In one example implementation, the service provider 102 may provide customer relationship management (CRM) services that enable organizations 104 to manage the relationships and interactions with customers. Additionally or alternatively, the service provider 102 may be implemented a software-as-a-service (SAAS), a platform-as-a-service (PAAS), or an infrastructure-as-a-service (IAAS). In another implementation, the service provider 102 may be provided by a cloud service provider that delivers computing resources over the Internet. Example cloud service providers include Amazon Web Services (AWS)™, Microsoft Azure™, and Google Cloud Platform (GCP), and IBM Bluemix™. The compute resources 112 may include servers, databases, storage, analytics, networking, software and intelligence.

The rules management system 100 may comprise a set of software services that enable users to create and execute one or more business rules 118 from the database 120 in a runtime production environment to automate complex decision-making. The rules management system 100 enables policies and other operational decisions of particular to each organization 104 to be defined, tested, executed and maintained. The rules management system 100 typically support rules, facts, priority (score), mutual exclusion, preconditions, and other functions. Within the service provider 102, the rules management system 100 includes a rules translator/compiler 114, a rules engine 115, a controller 116, and one or more databases 120. The rules translator/compiler 114 may comprise a rules translator 130 and a rules compiler 134, which are responsible for translating and compiling rules created by the user into executable rules that are stored in a database (e.g., DB 120). During runtime, the rules engine 115 loads and fires off the executable rules.

Typically, customer organizations interact with a rules system by manually writing rules in a given rule language specification (e.g., Drools Rule Language (DRL). The customer organizations that build rules, however, have very different use-cases and some may belong to different industries, resulting in significant differences in metadata between organizations. Because of this, a rule that the rules engine may validate for one organization will not necessarily be validated for another organization. In addition, requiring a user to manually write rules may result in many rule validation errors. Conventional guided rules editors are an improvement over manually written rules, but guided rules editors typically have free-form fields into which the user types data. Consequently, conventional guided rules editors may not significantly reduce the rate of validation errors over manually written rules.

According to disclosed implementations, the system 100 improves over conventional guided rule editors by providing a guided rule editor 122 that is driven by organization metadata 126 (and associated data). The system provider 102 makes the organization metadata 126 accessible to the guided rules editor by implementing an abstraction layer within the controller 116 called a metadata service 124 between the guided rules editor 122 and both the database 120 and the rules translator/compiler 114.

The guided rule editor 22 presents the user with a dynamic input form that allows the user to create new rules and/or modify existing rules 118 using a point-and-click interaction model. Through the metadata service 124, parts of the rules are automatically populated by the organization metadata 126 and data owned by the organization 104 of the user/rule author. Populating rules with the organization metadata 126 scopes down the data that is displayed by the guided rules editor 122 and selected by the user during rule creation/modification, significantly reducing the amount of validation errors.

In one implementation, the guided rules editor 122 is a web-based application hosted by the service provider 102 and displayed over the network 108 on the client device 125. Additionally or alternatively, the guided rules editor 122 may be implemented as a downloaded executable run on the client device 125.

In some such implementations, the service provider 102 includes application servers configured to implement and execute software applications as well as provide related data, code, forms, renderable web pages and documents and other information to and from client device 125 and to store to, and retrieve from, a database system related data, objects, and Web page content.

The service provider 102 can provide multi-tenant access to multiple hosted (standard and custom) applications, including the guided rules editor 122, through network 108 to the client device 125. The term "server" is meant to refer to a computing device or system, including processing hardware and process space(s), an associated storage medium such as a memory device or database, and, in some instances, a database application (for example, OODBMS or RDBMS) as is well known in the art. Similarly, the database 120 can be implemented as a single database, a distributed database, a collection of distributed databases, a database with redundant online or offline backups or other redundancies, etc., and can include a distributed database or storage network and associated processing intelligence.

The network 108 can be or include any network or combination of networks of systems or devices that communicate with one another. For example, the network 108 can be or include any one or any combination of a LAN (local area network), WAN (wide area network), wireless network, cellular network, point-to-point network, star network, or other appropriate configuration. The network 108 can include a TCP/IP (Transfer Control Protocol and Internet Protocol) network, such as the global internetwork of networks often referred to as the "Internet".

The client device 125 can communicate with service provider 102 using TCP/IP and, at a higher network level, other common Internet protocols to communicate, such as HTTP, FTP, AFS, WAP, etc. In an example where HTTP is used, the client device 125 can include an HTTP client commonly referred to as a "web browser" or simply a "browser" for sending and receiving HTTP signals to and from an HTTP server of the service provider 102. In some implementations, the compute resources 112 may include a network interface 18 between the service provider 102 and the network 108 having load sharing functionality, such as round-robin HTTP request distributors to balance loads and distribute incoming HTTP requests evenly over a number of servers. In some implementations, each of the servers can have access to the stored data; however, other alternative configurations may be used instead.

FIG. 2 is flow diagram illustrating the process 200 performed by the metadata driven guided rules editor and the controller. The process may begin by displaying a view of a user interface (UI) of the guided rules editor to a user on the client device 125 (block 202).

The metadata service fetches the metadata of an organization to which the user belongs, uses the metadata to identify which data of the organization is eligible for rule creation and uses attributes of the metadata to determine a layout of the one or more UI selection elements (block 204). In one implementation, the metadata service fetches the metadata of the organization based on the login credentials of the user and/or user account information.

The one or more UI selection elements are rendered in one or more positions in the view according to the layout and at least a portion of the one or more UI selection elements are automatically populated with the data of the organization (block 206). The guided rules editor 122 is configured as a drag and drop application in which components of the user interface (UI) are arranged in desired positions within the view. The guided rules editor 122 allows the user to create rules 118 visually with pre-built UI elements such as forms, tables, lists, maps views, buttons, etc. on a display screen. Rules are created by the user selecting various combinations of expression set elements, where each element in a set forma a logical step that runs sequentially.

Responsive to receiving user input of the one or more UI selection elements, one or more organization-specific rules to be executed by the rules engine are generated and saved to a data repository for subsequent rule compilation (e.g., database 120) (block 208). The guided rules editor 122 enables the user to incrementally create rules, and load and save existing rules.

Referring again to FIG. 1, the rule generation process performed by the system 100 is shown. As described above, the user first interacts with the guided rule editor 122 as a rule author to create rules 118 using the metadata driven point-and-click UI. As the rule author defines rules, a document structure file, e.g., a JSON (JavaScript Object Notation file) is created representing the structure of the organization-specific rule. The controller 116 or the metadata service 124 stores the document structure file in the database 120 (line 150). In one implementation, the document structure file is persisted to the database 120 as a binary file (e.g., a StringPlusCLOB or BLOB field).

Figure 3:
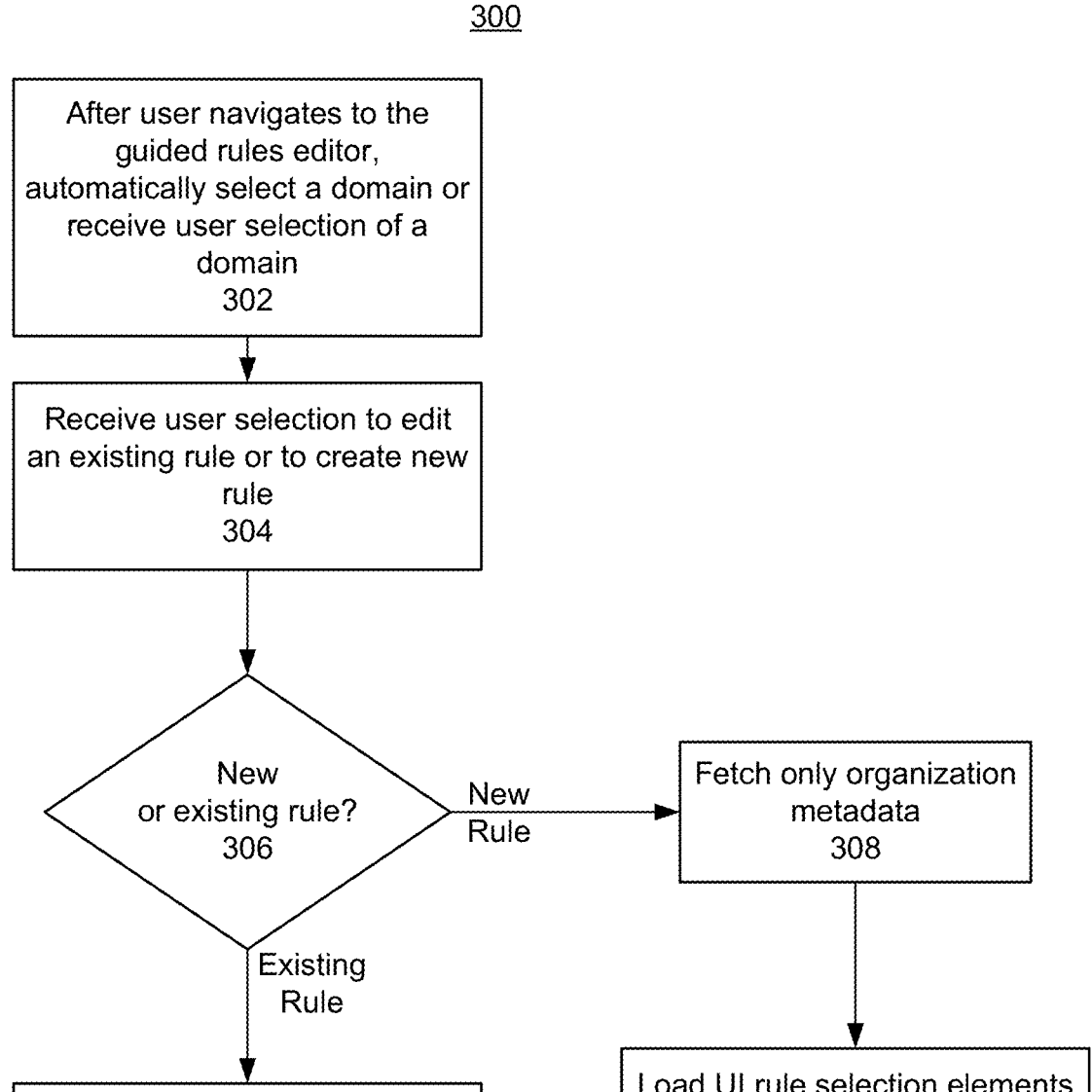
FIG. 3 is a flow diagram illustrating the metadata-driven process of the guided rule editor to limit the information the user can input into a rule.

FIG. 3 is a flow diagram illustrating the metadata-driven process of the guided rule editor 122 to limit the information the user can input into a rule. In one implementation, the user may optionally select a particular domain to which the rules 118 pertain. A domain may be a distinct subset of the Internet with IP addresses sharing a common suffix (e.g., "salesforce.com") or under the control of a particular organization or individual. Sometimes the domains may be associated with specific business units of the organization. Example types of business domains may include Pricing Rules that control the price of a transaction, Product Rules that control how products can be sold or bundled, Tax Rules that determine which taxes apply to a transaction, Validation Rules that exist to validate a transaction.

Responsive to the user navigating of the guided rules editor (e.g., via a URL), the guided rules editor may automatically select a domain to which the rules pertain based on the credentials of the user, or receives a selection of a domain from a plurality of displayed domains by the user in the UI (block 302). For example, in the case where the user's organization includes multiple domains, the guided rules editor 122 may display a page with UI elements for each of the domains. The user may then click on one of the domains to create/edit rules for that domain.

Once in the page for the domain, the guided rules editor 122 receives a user selection to edit an existing rule or to create a new rule (block 304). The guided rules editor 122 determines whether the user selected a new rule for an existing rule based on UI input (block 306). Responsive to the user selecting a new rule, the guided rules editor 122 sends a request to the metadata service 124 to fetch only the organization metadata 126 eligible to be made into rules (block 308). The metadata service 124 may use a domain selector and data dictionary 128 to retrieve the organization metadata 126 relevant to the selected domain and return the organization metadata 126 to the guided rules editor 122.

Responsive to the user selecting an existing rule (block 306), the guided rules editor 122 sends a request to the metadata service 124 to fetch both the organization metadata 126 and associated data (block 310). In this step, the metadata service 124 may use the organization metadata 126 to identify which data of the organization 104 is eligible for rule creation, and uses attributes of the organization metadata 126 to determine a layout of the one or more UI selection elements displayed by the guided rules editor 122.

The guided rules editor 122 then loads UI rule selection elements with the organization metadata 126 and the rule data if any (block 312). Loading the UI rule selection elements with the organization metadata and rule data that are eligible to be made into rules ensures that when the user actually creates/modifies rules, the user is unlikely to create a rule having validation mistakes. With this approach, the user is limited to how rules are created and what the rules contain. For example, the user can write a rule concerning the existence of an object or a field inside a transaction, but the guided rules editor 122 limits the choice of what objects and fields can be added to transaction rules.

Figure 4A:
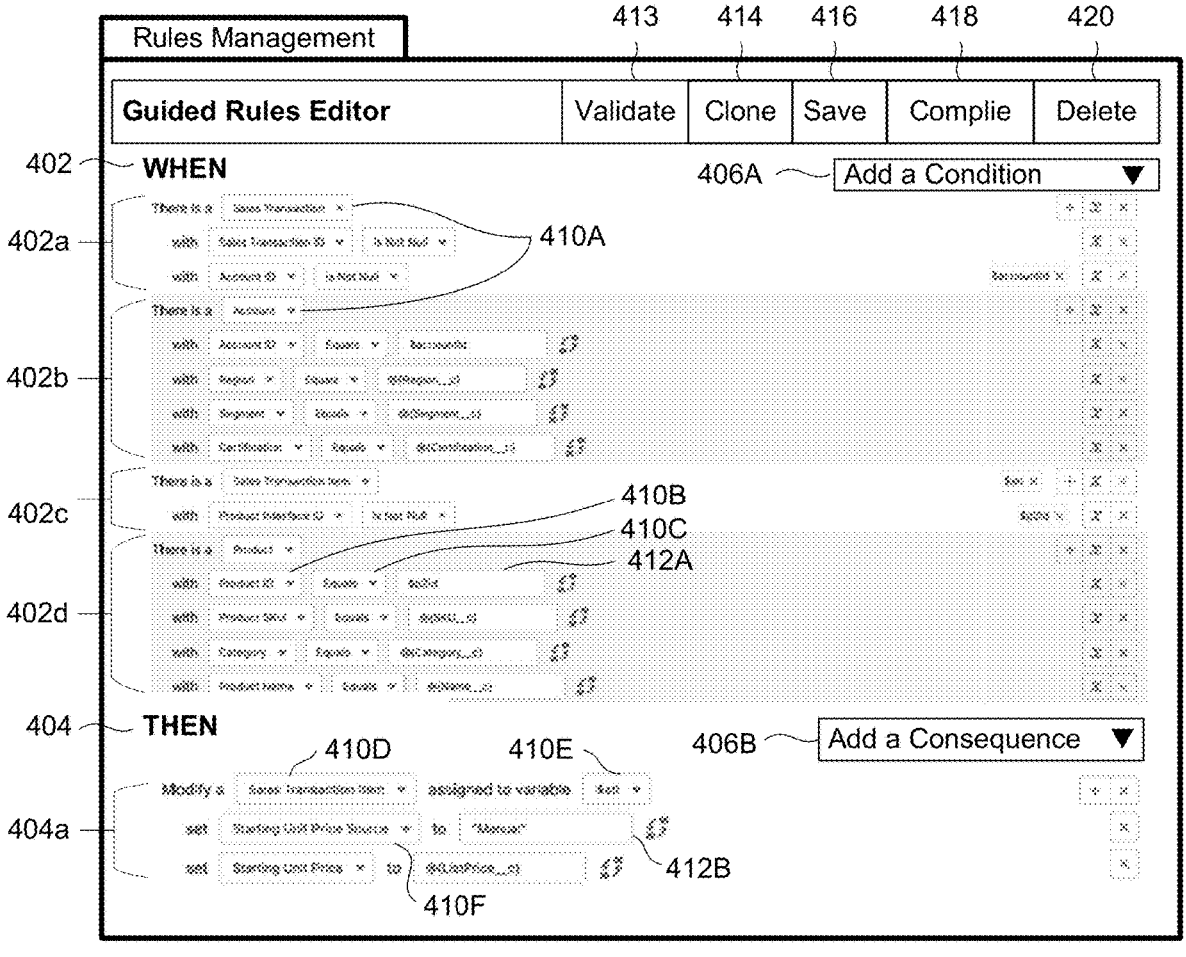
Figure 4B:
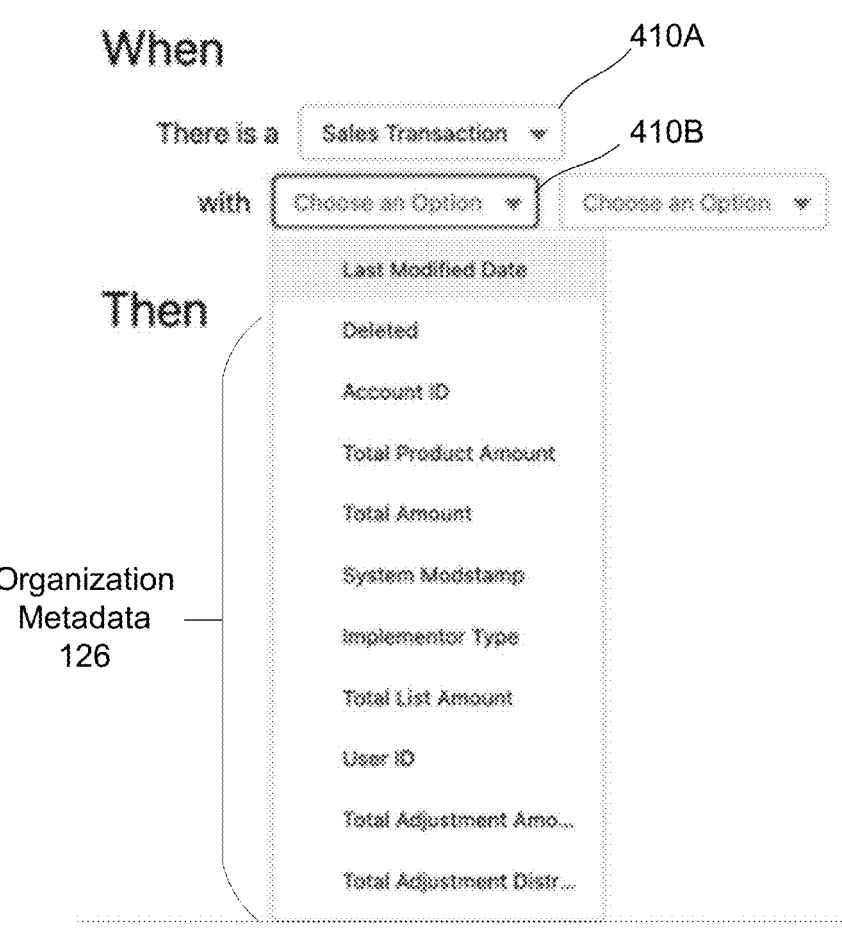

FIGS. 4A-4C are diagrams illustrating example rule pages 400A displayed by the UI of the guided rules editor. FIG. 4A illustrates rule page 400A, which is displayed when the user chooses to edit an existing rule. In one implementation, the user is limited to creating/editing rules using only point-and-click and drop down selections with no free-form fields to be completed by the user. The limitations are manifested as UI selection elements 406A-406B and 410A-410F (e.g., drop downs, buttons, etc.) that are automatically populated from the metadata to inherently limit what is made available to the user for selection. Notice the absence of any UI elements that require the user to select from sets of metadata to load.

The rule comprises a "When" condition section 402 and a "Then" consequence section 404. The "When" condition section 402 of the rule is a condition that must be met, while the "Then" consequence section 404 describes an action or consequence to be performed when the condition in the rule has been met.

In the existing rules page 400A, the guided rules editor displays a view of the rule in which both the organization metadata, as well as the data, for the rule are loaded in the UI selection elements 410A and 410B (collectively referred to as UI selection elements 410). In some implementations, the UI selection elements 410 include a carat element that can clicked by the user to display a hidden list of organization metadata or operators for user selection to limit what data is available to the user for selection (contrasted to, for example, a free text input).

FIG. 4B is a diagram illustrating an example pull-down list of auto populated organization metadata 126 for user selection within UI selection element 410B.

Referring again to FIG. 4A, the "When" condition section 402 of the example rule includes one or more When conditions 402a-402d, each of which defines a condition of the rule that must be met. Each When condition 402a-402d includes a "There is a" phrase followed by a UI selection element 410A that enables the user to select an organization metadata object (e.g., a "sales transaction", "region", etc.).

Each "There is a" phrase is followed by a "With" clause indicating conditions that must be met. Each "With" clause comprises i) a UI selection element 410B that enables to the use to select organization metadata attributes (e.g., Product ID); ii) a UI selection element 410C that enable the user to select mathematical operators (e.g., "equal", "is not null", and the like); and iii) an auto-populated data field 412 that is automatically filled with a value from the organization data (e.g., $P2ID) associated with the selected organization metadata attribute.

Notice that auto-populated data field 412 does not include a carat indicating selectable metadata, but instead is auto-populated with the variable name of data. In one implementation, attributes shown with leading and trailing special characters (e.g., "$", "@") may indicate rule template variables (e.g., $accountid) that are required when defining a variable within a rule template, where the value of the variable will be automatically retrieved and loaded into to the rule at runtime.

The "Then" condition section 404 of the example rule is performed when the When conditions 402a-402d are met. The "Then" condition section 404 includes one or more Modify consequences 404a, each of which includes a "Modify a" phrase, followed by a UI selection element 410D for selection of an organization metadata object, and a UI selection element 410E for selection of a variable name. Each "Modify a" phrase includes one or more "Set" clauses used to define a consequence. Each "Set" clause includes UI selection element 410F for selection of an object and an auto populated data field 412B containing a value to which the object will be set to. The guided rules editor may also support other actions, such as "Insert" and "Delete", and domain specific actions such as "Apply Discount" and "Notify User". The user can add additional When conditions 402 and Modify consequences 404a by clicking "Add a Condition" or "Add a Consequence" UI selection elements 406A and 406B, respectively.

The existing rules page 400B may also include UI elements for the user to Validate 413, Clone (copy) 414, Save 416, and Delete 418 the rule. Validate 413 causes the single rule displayed to be verified, Clone 414 causes the rule to be cloned or copied, Save 416 saves the rule, Compile 418 displays a new window for the user to select multiple rules that are compiled together as a knowledge base, and Delete 418 deletes the rule.

FIG. 4D illustrates page 400D, which is displayed when the user chooses to compile or deploy a set of rules. Page 400D displays multiple deployable/verified (i.e., "validated") rules and that are compiled together into a single Kbase 136 in response to the user clicking a UI element to Compile 420 the rules. The UI may indicate the rule type, e.g., a rule or a rule template, and for rule templates, the template source via a pull down UI element.

In some implementations, some of the UI selection elements 410A-410C and auto populated data field 412A may be shown or not depending on what organization metadata 126 is returned and made available for inclusion into the rule. For example, while the number of the "There is a" phrases is controlled the user by adding conditions using UI selection element 406A, the number of "With" clauses may depend on the number of organization metadata attributes that are associated with the selected organization metadata object in the "There is a" phrase.

The guided rules editor 122 ensures the user creates valid rules without manually specifying or pre-configuring meta-data files for ingestion by the rules system. For example, a user may write a rule concerning the existence of an object or a field inside a transaction, the user's choice of which objects and fields to choose is limited to what currently exists in their organizations based on their metadata, which is automatically loaded during rule creation.

Figure 5:
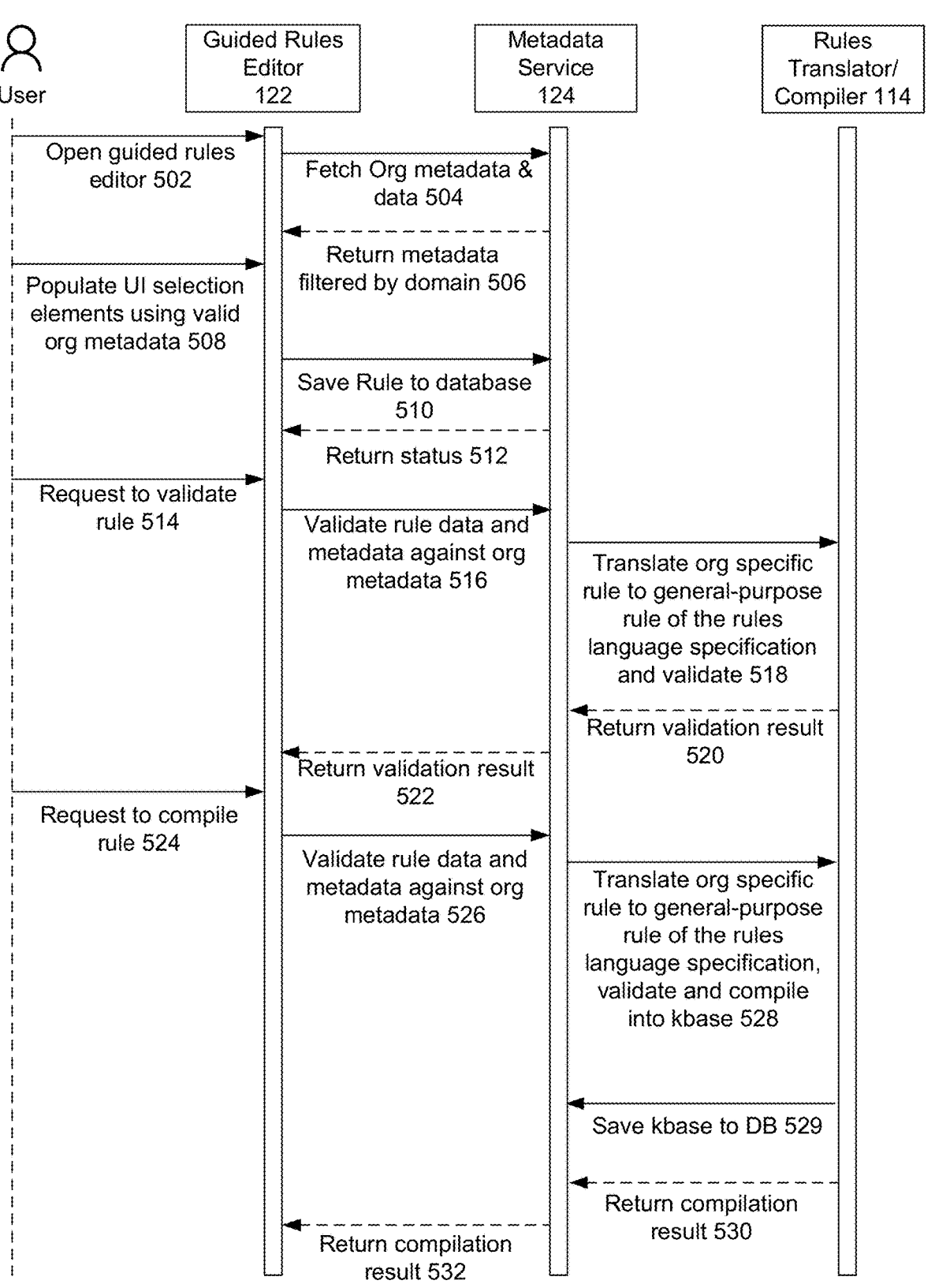
FIG. 5 is a flow diagram of between the guided rules editor, the database storing organization metadata, and the rules engine according the disclosed implementations.

FIG. 5 is a flow diagram of between the guided rules editor, the database storing organization metadata, and the rules engine according the disclosed implementations. Referring to both FIGS. 1 and 5, once the user opens the guided rules editor 122 and selects a rule via 502, the guided rules editor sends a call to the metadata service 124 to fetch the organization metadata 126 and associated data via 504. The metadata service returns the metadata and data filtered by domain via 506. The guided rules editor populates the UI selection elements using the returned organization metadata via 508. Once the user clicks "Save" 416 or otherwise periodically, the guided rules editor sends a call to the metadata service to save the rule to the database 120 via 510. The metadata service returns status of the save operation (e.g., success/fail) via 512.

Based on the user clicking "Validate" 413 or otherwise periodically, the guided rules editor sends a call to the metadata service to validate the rule via 514. The metadata service validates the rule data and the metadata against the organization metadata in the database 120 via 516. The validation operation validates both that the metadata con-tained within the rule definition is valid, and that the Rule itself is valid as well (variables are defined correctly; the structure of the rule makes sense, and the like). The reason for the metadata validation in 516 is that, even though the UI only shows valid metadata options, users can potentially modify the contents of their rule using browser tools directly (e.g., using chrome dev tools). Thus, the validation in 516 is performed to prevent a malicious user from attempting to run something unexpected.

The metadata service also sends a call to the rules translator 130, triggering the rules translator to translate the organization specific rules to a general-purpose rule of the rules language specification 156 required by the rules engine 114 via 518. The rules translator 130 returns a validation result via 520, which is forwarded by the metadata service 124 to the guided rules editor 122 via 522.

Once the user clicks "Compile" 420 UI selection element (e.g., see FIG. 4C), the guided rules editor sends a call to the metadata service to compile a selected set of rules via 524. The metadata service validates the rule data and the meta-data against the organization metadata in the database via 526. The metadata service also sends a call to the rule compiler 134, triggering the rules compiler to translate the organization specific rules to a general-purpose rule of the rules language specification 156, validate, and compile the general-purpose rule into a serialized knowledge base (kbase) 528 via 518.

There are two reasons for a second validation. The first is that the organization metadata 126 may have changed between when the user initially validates the rule and decides to compile the rule (there could be any amount of time between the two operations). The second is that this compilation step may occur across a batch of rules that are all deployed at once, and the validation is performed across all rules (which may be combined into a single, potentially large rules language specification file (e.g., a DRL) and that resulting file is validated). This is also the reason translation is performed a second time—to perform translation across the batch of rules instead of a single rule.

The rule compiler 134 sends a call to the metadata service to save the kbase 528 to the database 120 via 529. In another implementation, the compiler 134 may save the kbase 528 to the database 120 directly. The compiler 134 returns a compilation result (success/fail) via 530, which may be forwarded by the metadata service 124 to the guided rules editor 122 via 532.

Asynchronous Rule Compilation

Once the rule author has defined one or more rules, graphical representations of the rules is translated into a specific rule syntax required by the underlying rules engine 115 during compilation. As described above, when the user is ready to test/deploy a set of rules, the user may click the "Compile" or "Deploy" 420 UI selection element (FIG. 4C).

Traditionally, compiling is part of rule execution per-formed by the rules engine. In conventional rules engines, compilation and execution happens at the same time, where the rules engine synchronously performs compilation first followed by execution of the compiled rules, which intro-duces latency. For example, the compilation can take 1-2 seconds per rule, so with a large rule set, the compilation process is both memory intensive and time consuming, and adds to the overall time to execute the rules.

According to the present disclosure, implementations are disclosed for asynchronous rule compilation in a rules engine. More specifically, the compilation process may run on one thread to compile one rule set, while the execution process may run concurrently on another thread to execute another rule set, even if the compilation process and execu-tion process run on the same server.

Figure 6:
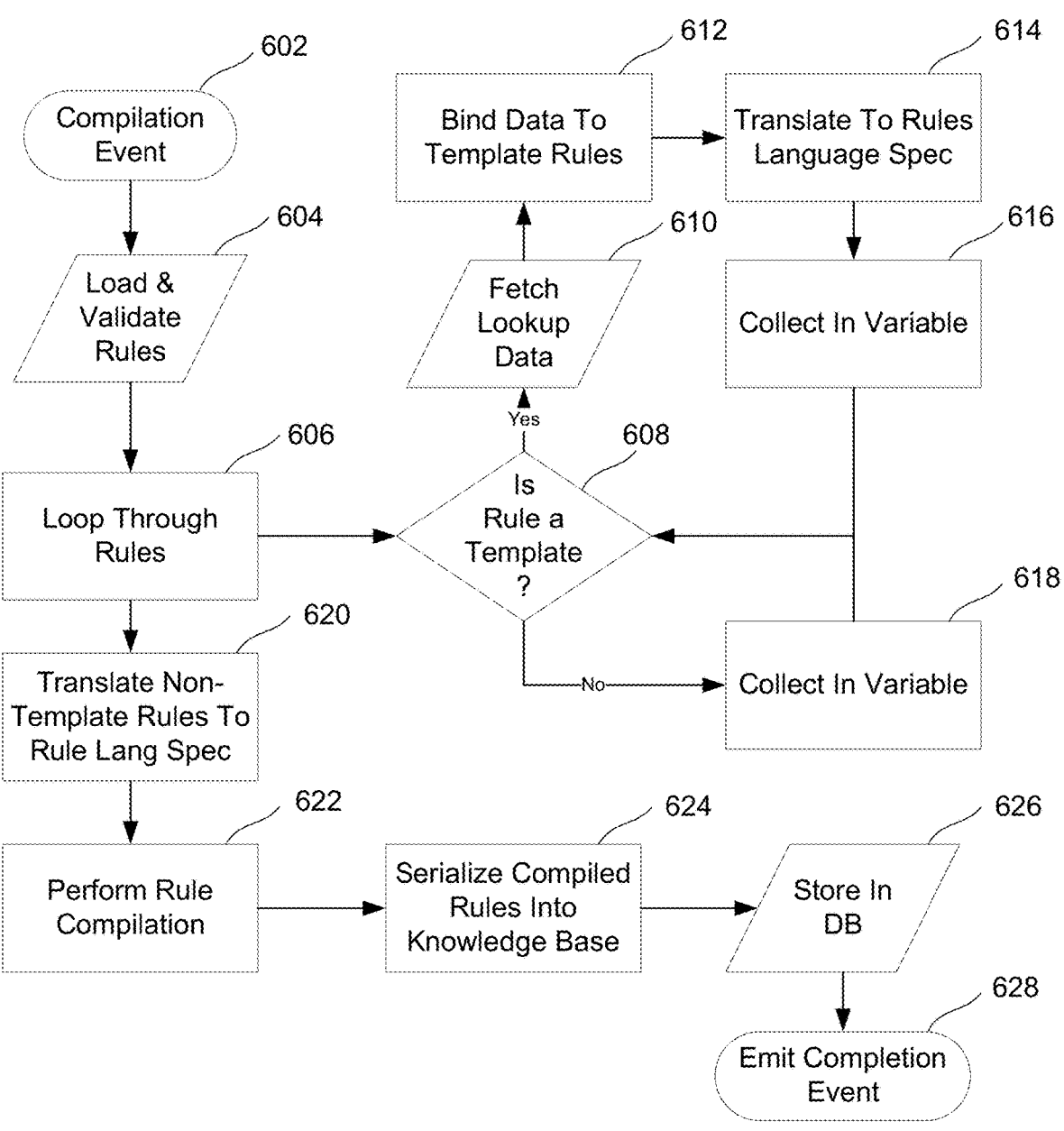
FIG. 6 is a diagram illustrating a process for implementing asynchronous rule compilation.

FIG. 6 is a diagram illustrating a process 600 for imple-menting asynchronous rule compilation. The process may begin by receiving, by an event handler, a compile rules event from a process external to the rule compiler 114 (block 602).

Referring again to FIG. 1, an overview of the compilation process is shown in which the event handler may correspond to the compile rules handler 142. Responsive to the user clicking on "compile" in the UI of the guided rules editor 122, the compilation API 140 is invoked and emits a "compile rules event" that is received by the compile rules handler 142 (via line 148). For example, the guided rules editor 122 may send a message as a "compile" event through compilation API 140 to the compile rules handler 142 outside of the rules engine 114.

In some implementations, the "compile rules event" may be sent as an inter-process communication (IPC) mechanism that allows processes to exchange data in the form of messages between two processes. For example, rule com-pilation may be performed in a Message Queue (MQ) thread, which is a standards-based solution providing asyn-chronous messaging for distributed applications. An MQ thread enqueues a message for rule compilation in response to the user triggering the "Compile" UI selection element. The user is then free to continue other tasks, since compi-lation is performed asynchronously. When the rules system dequeues the enqueued message, the rules are compiled and the result (success/failure) is sent electronically (via the UI, text, event, email and the like) to the user.

The remaining operations are performed within a rules compilation thread separate from a rules execution thread. The compilation thread may be a tier lower than the execution thread to prevent starvation of resources. In addition, concurrency of the compilation process may be set to one per organization to make sure that only one compilation thread runs at a time.

Referring again to FIG. 6, a set of one or more rules are retrieved from a database and the set of rules is loaded into a memory and validated (block 604). Retrieval of the set of rules in response to the "compile" event (line 148) is shown in FIG. 1 in which the compile rules handler 142 calls the metadata service 124 to perform validation on the set of rules (via line 151). The metadata service 124 retrieves then loads the set of rules from the database 120 (which may be stored as JSON file) into memory and the metadata service 124 performs syntactical validations on syntax in the rules, and logic-specific validations on certain rule statements based on the organization metadata 126.

After the metadata service 124 signals a successful validation, the compile rules handler 142 loops through the loaded rules one by one (block 606) to identify any template rules (block 608). A template rule is similar to regular rules. However, a template rule include one or more placeholder variables whose values are loaded from an identified data source (e.g., a DB table) so that instead of the user having to create "n" rules, the compiler creates "n" rules for each row in the data source. Responsive to identifying a template rule, the compile rules handler 142 fetches lookup data (block 610) and binds the lookup data to the template type rules (block 612).

Both the template rules and any non-template rules are translated into a rule language specification (blocks 614 and 620, respectively) (see also FIG. line 152), as follows. Rule translation is the process of translating the organization-specific rules defined in the document structure file (e.g., a JSON file) into general-purpose rules and validated syntax according to the rules language specification 156 (e.g., DRL). As shown in FIG. 1, the compile rules handler 142 calls the rules translator 130 to perform rule translation. The rules translator 130 deserializes the document structure file (e.g., converts strings in the JSON file into objects) and creates a model, such as Java-based abstract syntax tree (AST) or just syntax tree 132 (via line 154). The AST or syntax tree 132 is a tree representation of the abstract syntactic structure of text that will become the final rules language specification, where each node of the tree denotes an element of a rule to be generated from the text of the JSON document. The rules translator 130 generates the rules language specification 156 required by the rules engine 114 by converting the AST 132.

The rules translator 130 may use a template engine (not shown) to convert the AST into the rules language specification 156. The template engine replaces variables in the template rule with actual values, and transforms the template into the rules language specification 156. As an example, assume a template rule includes a template variable called @{User.userName}. In steps 610 and 612, this variable would be replaced for each "userName" field from a "User" table, for instance. If the "User" table includes "n" users, "n" rules would be created with one userName each within a condition or action statement. This way, if the data source expands (new data inserted) or contracts (rows deleted), and the user does not have to manually maintain their rules. The user may simply recompile the rules and new rules are deployed based on the latest state of the data source.

For template rules, the rules translator 130 also collects in variable (block 616). In one example, implementation, two data structures (e.g., a List<Rule> templateRules and List<Rule> nonTemplateRules) may be used to keep track of template rules versus non-template rules. In block 616, the template rules are added to List<Rule> templateRules, i.e., templateRules.add(currentRule).

The process continues at block 608 to evaluate the next rule. If the rule is not a template rule, then the collect in variable step (block 618) adds the non-template rule to List<Rule> nonTemplateRules, i.e., nonTemplateRules.add (currentRule).

In block 620, for non-template rules, the compile rules handler 142 calls the rules translator 130 to perform rule translation to translate the template rules into a rules language specification. The results of translation of both the template rules and non-template rules in blocks 614 and 620, respectively, are combined and collected into a single variable at the end of block 620 and before rule compilation (block 622).

The rules compiler 134 then begins to perform a rule compilation process (block 622) asynchronously from a rule execution process to translate the collection of translated rules into a knowledge base (kbase) 136 that is to be used as input by the rule execution process performed by the rules engine 115. More specifically, the rules compiler 134 takes the rules language specification 156 comprising the collection of translated rules as input and generates compiled rules, serializes the compiled rules into a serialized knowledge base (kbase) 136 comprising a byte array (block 624), and stores the kbase 136 to the database 120 (block 626 and FIG. 1, line 158). In one implementation, the kbase 136 may be stored in a binary large object (BLOB) field of the organization 104 for execution at runtime.

On completion of compilation, a compile completion event (success/failure) is electronically sent to the user (block 628). For example, the guided rules editor 122 may display an indication of whether a rule has been compiled and deployed for subsequent rule execution. Additionally or alternatively, the controller 116 or another component may generate and send an email notification to the user when compilation is complete.

In further implementations, the compilation process emits an event (success/failure) at the end, and may include an inherent retry mechanism in case of non-blocking recoverable errors. For, example, assume during compilation a non-blocking recoverable failure occurs in the infrastructure, such as the database was bogged down by too many concurrent requests and cannot handle a current request at that point in time, and returns an error. In response, the compilation process is re-enqueued after a period of time (e.g., a minute) to give the infrastructure time to recover. This is an example of a non-blocking recoverable error and the user is not requested to take any action due to an internal infrastructure issue, and the error is handled automatically.

In addition, the compilation process may include a failure handling mechanism that handles non-recoverable failures gracefully. Responsive to a non-recoverable failure, the failure handling mechanism stops compilation and sends a failure event (e.g., an email) to the user explaining the failure. For example, assume that during compilation a non-recoverable error occurs—such as for example, the size of the compiled knowledge base exceeds a size threshold. In such a case, the system may inform the user that the rules exceed this size limit.

Further, the system includes configuration guardrails to prevent excessive resource utilization and misuse. In some implementations, the configuration guardrails may set maximum limits on the number of rules per rule set, the number of template rules per rule set, and the overall size of the compiled knowledge base (e.g., 10 MB). Since compilation is performed in shared a multi-tenant infrastructure, the system is cognizant of the amount of shared server memory and cache memory that the knowledge base occupies. Furthermore, greater the size of the knowledge base, longer the time it takes to deserialize and inflate the knowledge base during execution. In other implementations, the 10 MB for the knowledge base size may be increased depending on available resources and performance and memory footprint tuning.

Figures 7A, 7B:
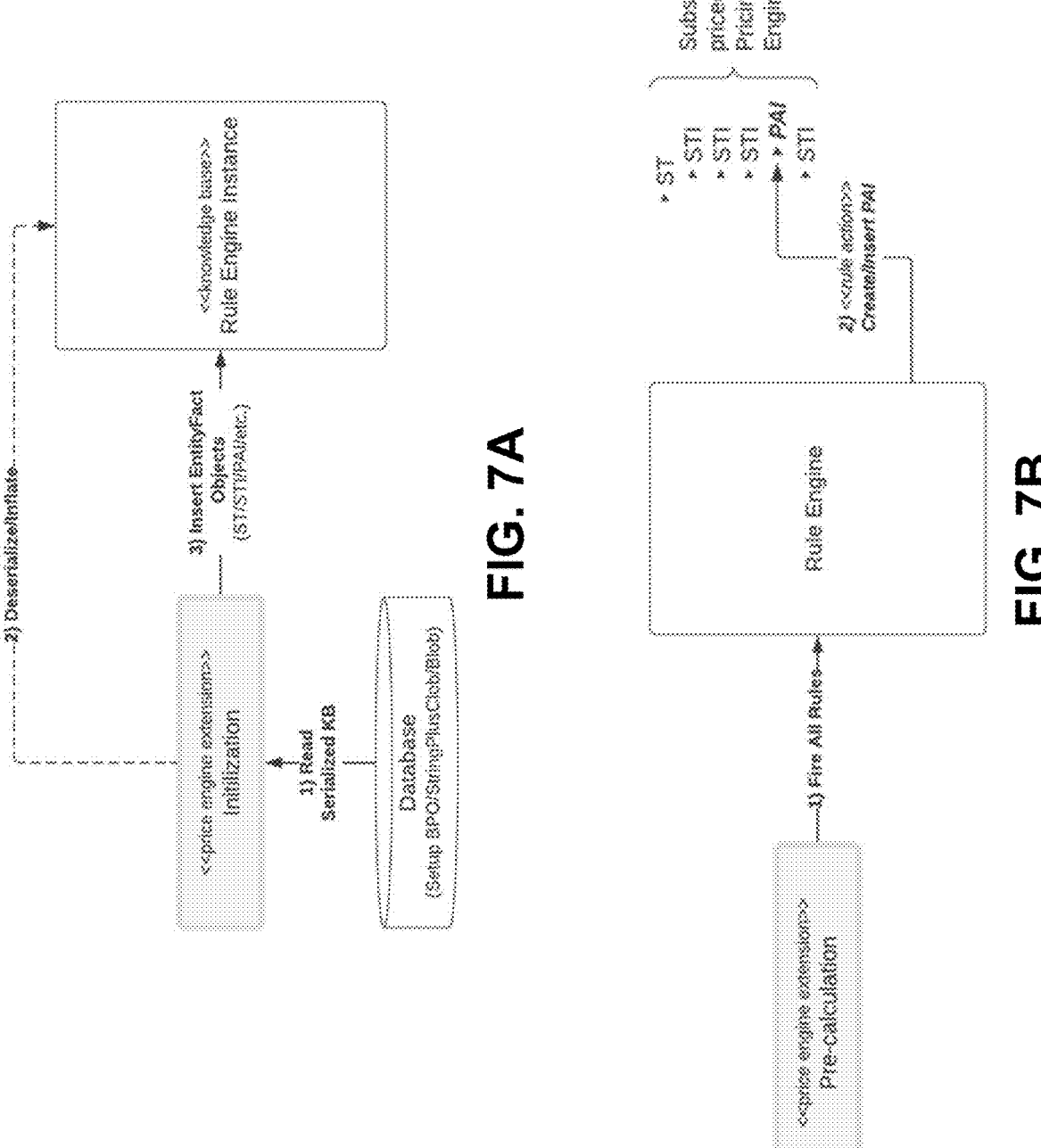
FIGS. 7A and 7B illustrate an example rule execution thread of a pricing engine, which is separate from, and asynchronous to, the compilation thread.

FIGS. 7A and 7B illustrate an example rule execution thread of a pricing engine, which is separate from, and asynchronous to, the compilation thread. In FIG. 7A, As part of an initialization step, the pricing engine first loads the knowledge base (step 1), which was created and stored by the compilation thread, deserializes/inflates the knowledge base (step 2). Finally, the pricing engine inserts facts into the inflated the knowledge base for rule execution by a rule engine instance (step 3).

Next, the pricing engine moves on to the pre-calculation step, as shown FIG. 7B. Since the rules engine was prepared to fire in the initialization step, the pricing engine fires all rules during pre-calculation. An example of rule firing is shown that inserts a Price Adjustment Item (PAI) object, i.e., a discount, which is subsequently priced by the pricing engine.

Advantages of the disclosed implementations for asynchronous rule compilation include the following:

Generally, compilation and execution happens at the same time. Here compilation and execution are completely asynchronous, where compilation runs in a thread separate from rule execution for performance reasons to make execution and runtime faster.

The compilation thread may be a low tier thread to prevent starvation of resources Concurrency set to one per organization so that only one compilation thread runs at a time Compilation emits event (success/failure) at the end, and inherent retry mechanism in case of non-blocking recoverable errors.

Adds guardrails to prevent excessive resource utilization and misuse, including maximum rules per rule set, maximum template rules per rule set, and maximum size of compiled knowledge base.

Compilation handles failures gracefully

Example Electronic Devices and Environments

Electronic Device and Machine-Readable Media

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing"

(and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 8A:
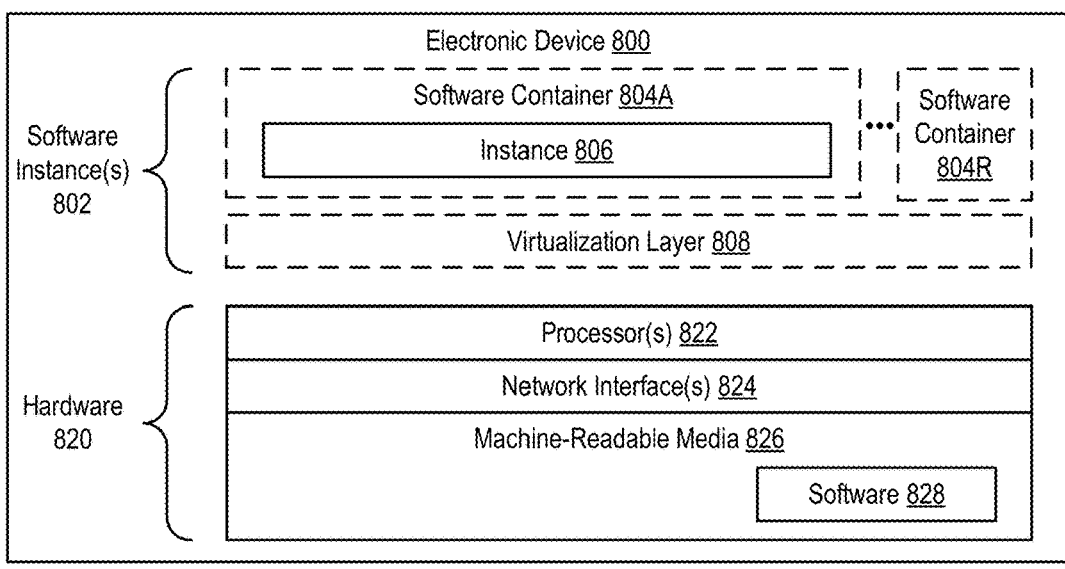
FIG. 8A is a block diagram illustrating an electronic device according to some example implementations.

FIG. 8A is a block diagram illustrating an electronic device 800 according to some example implementations. FIG. 8A includes hardware 820 comprising a set of one or more processor(s) 822, a set of one or more network interfaces 824 (wireless and/or wired), and ma-chine-readable media 826 having stored therein software 828 (which includes instructions executable by the set of one or more processor(s) 822). The machine-readable media 826 may include non-transitory and/or transitory machine-readable media. Each of the previously described clients and the network protocol for the asynchronous rule compilation may be implemented in one or more electronic devices 800. In one implementation: 1) each of the clients is implemented in a separate one of the electronic devices 800 (e.g., in end user devices where the soft-ware 828 represents the software to implement clients to interface directly and/or indirectly with the network protocol for the asynchronous rule compilation (e.g., software 828 represents a web browser, a native client, a portal, a command-line interface, and/or an application programming interface (API) based upon protocols such as Simple Object Access Protocol (SOAP), Representational State Transfer (REST), etc.)); 2) the network protocol for the asynchronous rule compilation is implemented in a separate set of one or more of the electronic devices 800 (e.g., a set of one or more server devices where the software 828 represents the software to implement the net-work protocol for the asynchronous rule compilation); and 3) in operation, the electronic devices implementing the clients and the network protocol for the asynchronous rule compilation would be communicatively coupled (e.g., by a network) and would establish between them (or through one or more other layers and/or or other services) connections for submitting configuration data to the network protocol for the asynchronous rule compilation and returning a software package to the clients. Other configurations of electronic devices may be used in other implementations (e.g., an implementation in which the client and the network protocol for the asynchronous rule compilation are implemented on a single one of electronic device 800).

During operation, an instance of the software 828 (illustrated as instance 806 and referred to as a software instance; and in the more specific case of an application, as an application instance) is executed. In electronic devices that use compute virtualization, the set of one or more processor(s) 822 typically execute software to instantiate a virtualization layer 808 and one or more software container(s) 804A-804R (e.g., with operating system-level virtualization, the virtualization layer 808 may represent a container engine (such as Docker Engine by Docker, Inc. or rkt in Container Linux by Red Hat, Inc.) running on top of (or integrated into) an operating system, and it allows for the creation of multiple software containers 804A-804R (representing separate user space instances and also called virtualization engines, virtual private servers, or jails) that may each be used to execute a set of one or more applications; with full virtualization, the virtualization layer 808 represents a hypervisor (sometimes referred to as a virtual machine monitor (VMM)) or a hypervisor executing on top of a host operating system, and the software containers 804A-804R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 828 is executed within the software container 804A on the virtualization layer 808. In electronic devices where compute virtualization is not used, the instance 806 on top of a host operating system is executed on the "bare metal" electronic device 800. The instantiation of the instance 806, as well as the virtualization layer 808 and software containers 804A-804R if implemented, are collectively referred to as software instance(s) 802.

Alternative implementations of an electronic device may have numerous variations from that described above. For example, customized hardware and/or accelerators might also be used in an electronic device.

Example Environment

Figure 8B:
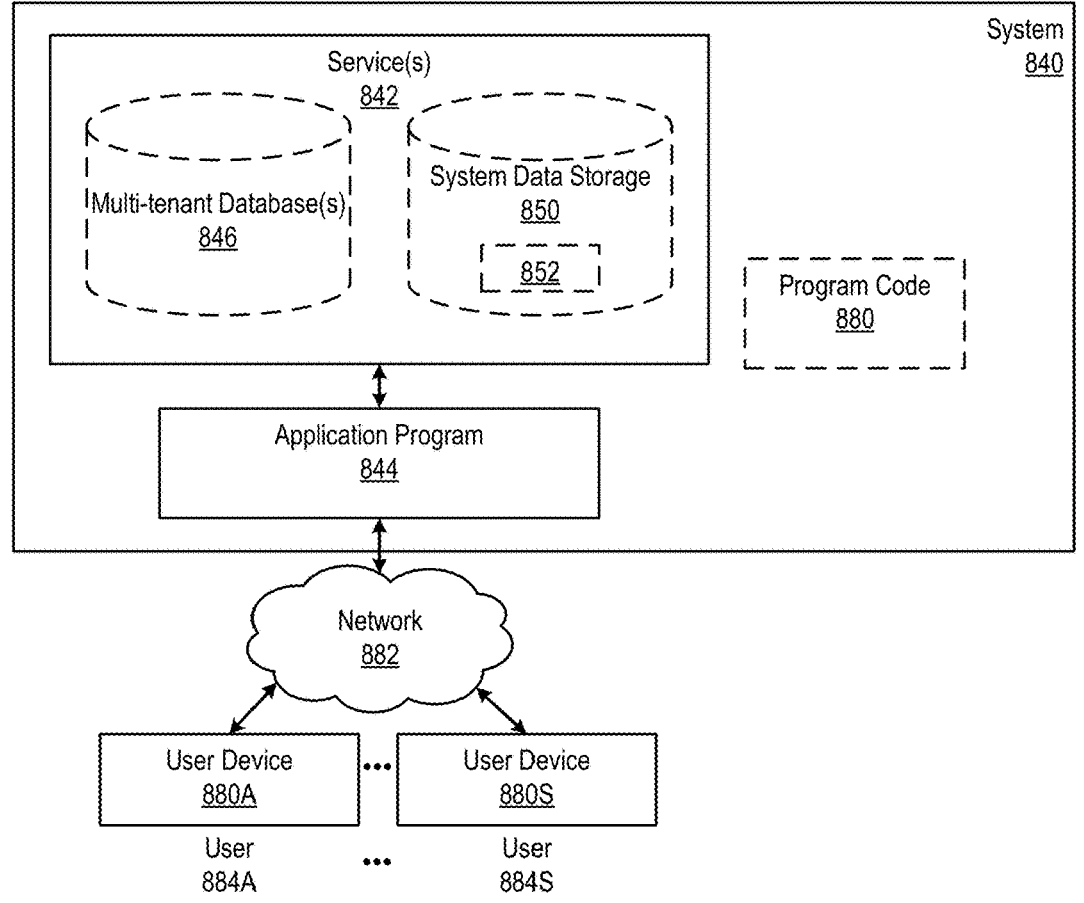
FIG. 8B is a block diagram of a deployment environment according to some example implementations.

FIG. 8B is a block diagram of a deployment environment according to some example implementations. A system 840 includes hardware (e.g., a set of one or more server devices) and software to provide service(s) 842, including the net-work protocol for the asynchronous rule compilation. In some implementations the system 840 is in one or more datacenter(s). These datacenter(s) may be: 1) first party datacenter(s), which are datacenter(s) owned and/or operated by the same entity that provides and/or operates some or all of the software that provides the service(s) 842; and/or 2) third-party datacenter(s), which are datacenter(s) owned and/or operated by one or more different entities than the entity that provides the service(s) 842 (e.g., the different entities may host some or all of the software provided and/or operated by the entity that provides the service(s) 842). For example, third-party datacenters may be owned and/or oper- ated by entities providing public cloud services (e.g., Amazon.com, Inc. (Amazon Web Services), Google LLC (Google Cloud Platform (GCP)), Microsoft Corporation (Azure)).

The system 840 is coupled to user devices 880A-880S over a network 882. The service(s) 842 may be on-demand services that are made available to one or more of the users 884A-884S working for one or more entities other than the entity which owns and/or operates the on-demand services (those users sometimes referred to as outside users) so that those entities need not be concerned with building and/or maintaining a system, but instead may make use of the service(s) 842 when needed (e.g., when needed by the users 884A-884S). The service(s) 842 may communicate with each other and/or with one or more of the user devices 880A-880S via one or more APIs (e.g., a REST API). In some implementations, the user devices 880A-880S are operated by users 884A-884S, and each may be operated as a client device and/or a server device. In some implementations, one or more of the user devices 880A-880S are separate ones of the electronic device 800 or include one or more features of the electronic device 800.

In some implementations, the system 840 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 840 is a multi-tenant cloud computing architecture supporting multiple services, such as one or more of the following types of services: Self-Healing Build Pipeline service 842; Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual ma-chines, servers, and/or storage); Analytics; Community; Internet-of-Things (IoT); Industry-specific; Artificial intelligence (AI); Application marketplace ("app store"); Data modeling; Security; and Identity and access management (IAM). For example, system 840 may include an application platform 844 that enables PAAS for creating, managing, and executing one or more applications developed by the provider of the application platform 844, users accessing the system 840 via one or more of user devices 880A-880S, or third-party application developers accessing the system 840 via one or more of user devices 880A-880S.

In some implementations, one or more of the service(s) 842 may use one or more multi-tenant databases 846, as well as system data storage 850 for system data 852 accessible to system 840. In certain implementations, the system 840 includes a set of one or more servers that are running on server electronic devices and that are configured to handle requests for any authorized user associated with any tenant (there is no server affinity for a user and/or tenant to a specific server). The user devices 880A-880S communicate with the server(s) of system 840 to request and update tenant-level data and system-level data hosted by system 840, and in response the system 840 (e.g., one or more servers in system 840) automatically may generate one or more Structured Query Language (SQL) statements (e.g., one or more SQL queries) that are designed to access the desired information from the multi-tenant database(s) 846 and/or system data storage 850.

In some implementations, the service(s) 842 are implemented using virtual applications dynamically created at run time responsive to queries from the user devices 880A-880S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 860 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 844 includes an application setup mechanism that supports application developers' creation and management of applications, which may be saved as metadata by save routines. Invocations to such applications, including the network protocol for the asynchronous rule compilation, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 882 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 840 and the user devices 880A-880S.

Each user device 880A-880S (such as a desktop personal computer, workstation, lap-top, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 840. For example, the user interface device can be used to access data and applications hosted by system 840, and to perform searches on stored data, and otherwise allow one or more of users 884A-884S to interact with various GUI pages that may be presented to the one or more of users 884A-884S. User devices 880A-880S might communicate with system 840 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 880A-880S might include an HTTP client, commonly referred to as a "browser," for sending and receiving HTTP messages to and from server(s) of system 840, thus allowing users 884A-884S of the user devices 880A-880S to access, process and view information, pages and applications available to it from system 840 over network 882.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A computing device, comprising:
  one or more processors; and
  a non-transitory machine-readable storage medium that provides instructions that, if executed by the one or more processors, are configurable to cause the computing device to compile rules for a rules engine by:
    receiving, by an event handler, a compile rules event from a process external to a rule compiler;
    retrieving a set of rules from a database;
    loading the set of rules into a memory, wherein the set of rules includes template rules and non-template rules;
    fetching data from a data source, wherein placeholder variables included in the template rules are replaced with the fetched data;
    generating a rules language specification based on the template rules and the non-template rules;
    executing a compilation thread on the rules language specification to generate compiled rules;

asynchronously executing an execution thread concurrently with the compilation thread to perform a rule execution process;

storing a serialized knowledge base in a database for use by the rules engine during a subsequent rule execution process, wherein the serialized knowledge base includes serialized compiled rules; and outputting a compile completion event.

2. The computing device of claim 1, wherein the compilation thread is on a tier lower than the execution thread.

3. The computing device of claim 1, wherein the compilation thread is executed in a multi-tenant infrastructure servicing multiple organizations, and wherein concurrency of compilation thread execution is set to one per organization so that only one compilation thread runs is executed at a time per organization.

4. The computing device of claim 1, further comprising a retry mechanism, which responsive to a non-blocking recoverable error, a rule compilation process is re-enqueued after a period of time to provide infrastructure time to recover.

5. The computing device of claim 1, further comprising a failure handling mechanism, which responsive to a non-recoverable failure, stops a compilation process and sends a failure event to a user explaining the failure.

6. The computing device of claim 1, further comprising configuration guardrails to prevent excessive resource utilization, the configuration guardrails including maximum limits on a number of rules per rule set, a number of template rules per rule set, and an overall size of a compiled knowledge base.

7. A non-transitory machine-readable storage medium that provides instructions that, if executed by a set of one or more processors, are configurable to cause the set of one or more processors to perform operations comprising:

receive, by an event handler, a compile rules event from a process external to a rule compiler;

retrieve a set of rules from a database; load the set of rules into a memory, wherein the set of rules includes template rules and non-template rules;

fetch data from a data source, wherein placeholder variables included in the template rules are replaced with the fetched data;

generate a rules language specification based on the template rules and the non-template rules;

execute a compilation thread on the rules language specification to generate compiled rules;

asynchronously execute an execution thread concurrently with the compilation thread to perform a rule execution process;

store a serialized knowledge base in a database for use by a rules engine during a subsequent rule execution process, wherein the serialized knowledge base includes serialized compiled rules; and output a compile completion event.

8. The non-transitory machine-readable storage medium of claim 7, wherein the compilation thread is on a tier lower than the execution thread.

9. The non-transitory machine-readable storage medium of claim 7, wherein the compilation thread is executed in a multi-tenant infrastructure servicing multiple organizations, and wherein concurrency of compilation thread execution is set to one per organization so that only one compilation thread is executed at a time per organization.

10. The non-transitory machine-readable storage medium of claim 7, further comprising a retry mechanism, which responsive to a non-blocking recoverable error, a rule compilation process is re-enqueued after a period of time to provide infrastructure time to recover.

11. The non-transitory machine-readable storage medium of claim 7, further comprising a failure handling mechanism, which responsive to a non-recoverable failure, stops a compilation process and sends a failure event to a user explaining the failure.

12. The non-transitory machine-readable storage medium of claim 7, further comprising configuration guardrails to prevent excessive resource utilization, the configuration guardrails including maximum limits on a number of rules per rule set, a number of template rules per rule set, and an overall size of a compiled knowledge base.

13. A method comprising:

receiving, by an event handler, a compile rules event from a process external to a rule compiler;

retrieving a set of rules from a database;

loading the set of rules into a memory, wherein the set of rules includes template rules and non-template rules;

fetching data from a data source, wherein placeholder variables included in the template rules are replaced with the fetched data;

generating a rules language specification based on the template rules and the non- template rules;

executing a compilation thread on the rules language specification to generate compiled rules;

asynchronously executing an execution thread concurrently with the compilation thread to perform a rule execution process;

storing a serialized knowledge base in a database for use by a rules engine during a subsequent rule execution process, wherein the serialized knowledge base includes serialized compiled rules; and outputting a compile completion event.

14. The method of claim 13, wherein the compilation thread is on a tier lower than the execution thread.

15. The method of claim 13, wherein the compilation thread is executed in a multi-tenant infrastructure servicing multiple organizations, and wherein concurrency of compilation thread execution is set to one per organization so that only one compilation thread is executed at a time per organization.

16. The method of claim 13, further comprising a retry mechanism, which responsive to a non-blocking recoverable error, a rule compilation process is re-enqueued after a period of time to provide infrastructure time to recover.

17. The method of claim 13, further comprising a failure handling mechanism, which responsive to a non-recoverable failure, stops a compilation process and sends a failure event to a user explaining the failure.

18. The method of claim 13, further comprising configuration guardrails to prevent excessive resource utilization, the configuration guardrails including maximum limits on a number of rules per rule set, a number of template rules per rule set, and an overall size of a compiled knowledge base.

* * * * *